Aug. 21, 1962 T. SENDZIMIR 3,049,948
DUAL DRIVE PLANETARY REDUCING MILLS
Original Filed June 11, 1954 5 Sheets-Sheet 1
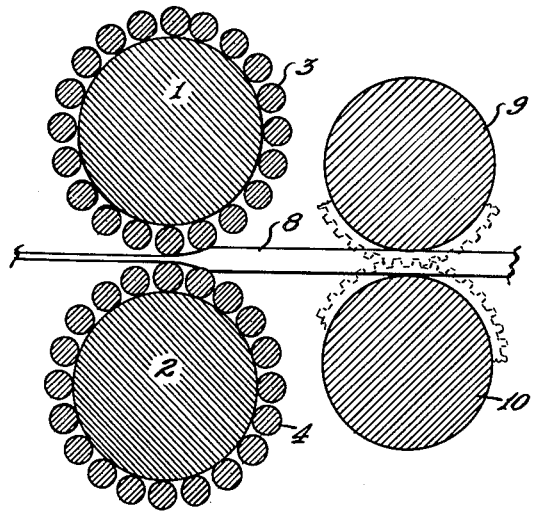
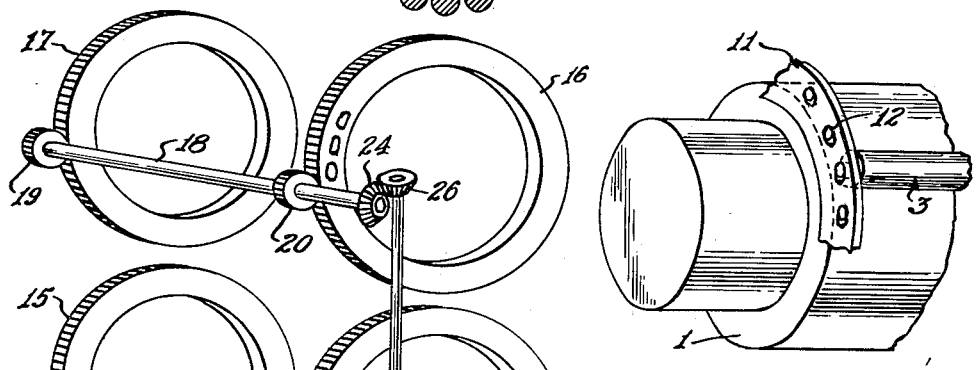
INVENTOR.
TADEUSZ SENDZIMIR,
BY Allen & Allen
ATTORNEYS.

INVENTOR.
TADEUSZ SENDZIMIR,
BY Allen + Allen
ATTORNEYS.

Aug. 21, 1962  T. SENDZIMIR  3,049,948
DUAL DRIVE PLANETARY REDUCING MILLS
Original Filed June 11, 1954  5 Sheets-Sheet 3

INVENTOR.
TADEUSZ SENDZIMIR,
BY
Allen & Allen
ATTORNEYS.

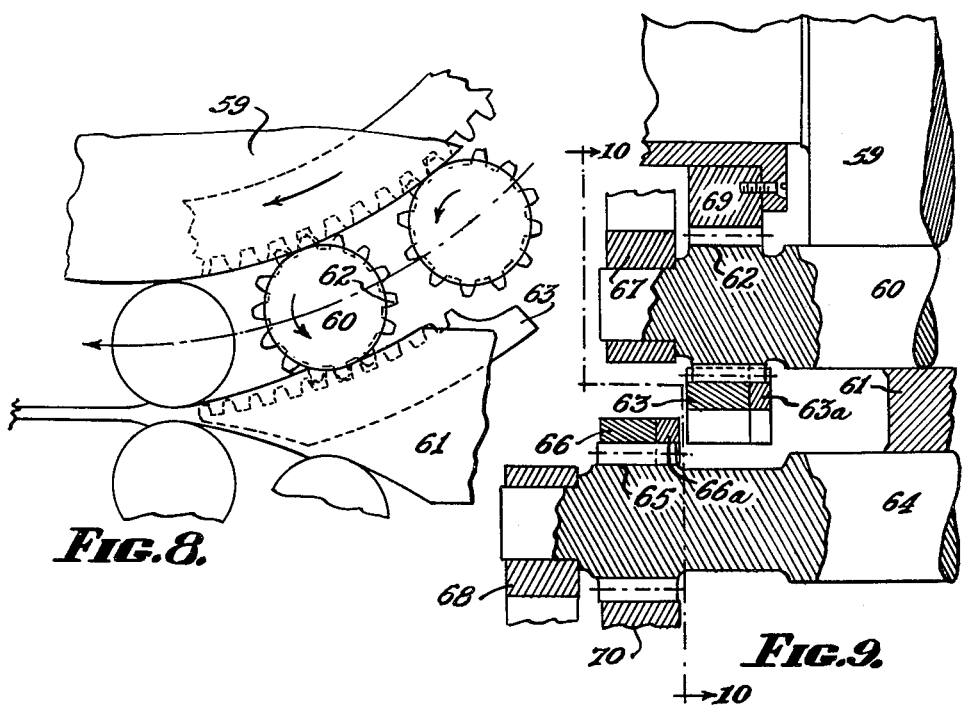
FIG. 8.
FIG. 9.
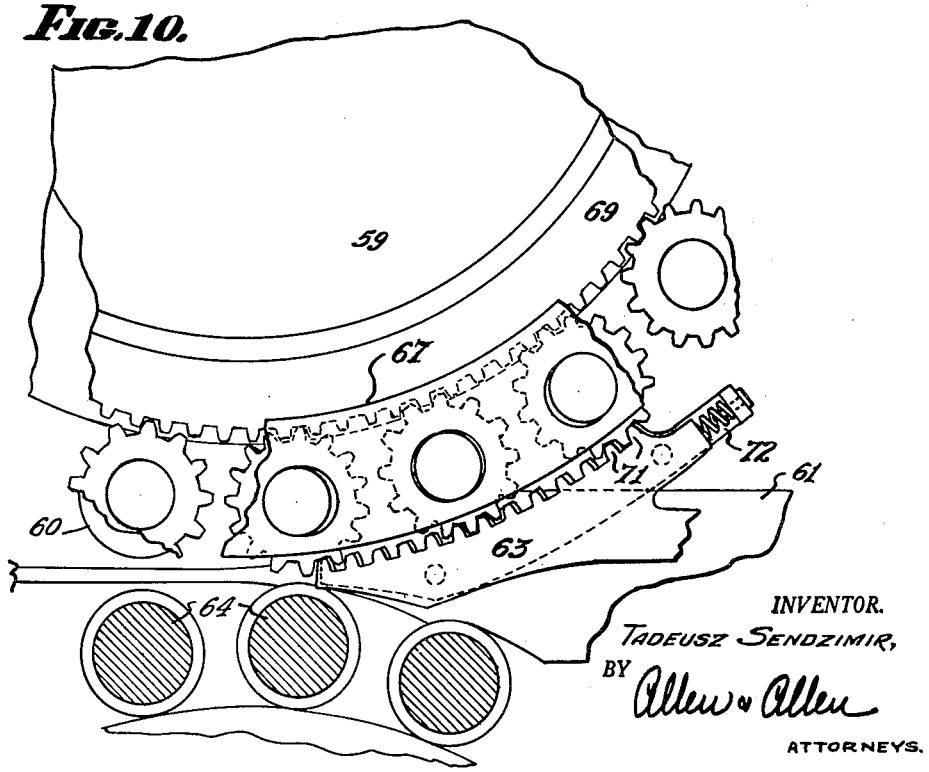
FIG. 10.

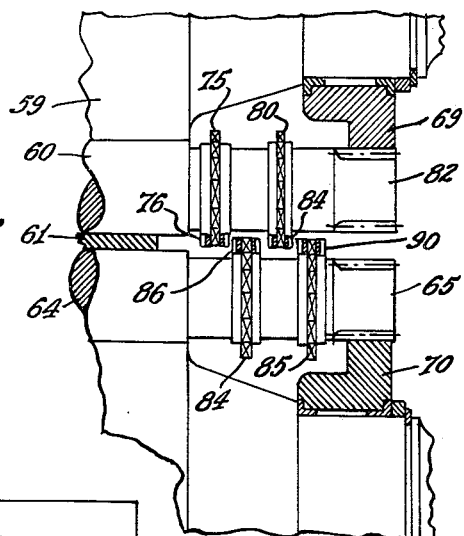

United States Patent Office 3,049,948
Patented Aug. 21, 1962

3,049,948
DUAL DRIVE PLANETARY REDUCING MILLS
Tadeusz Sendzimir, Waterbury, Conn., assignor, by mesne assignments, of three-fortieths to Tadeusz Sendzimir and Bertha Sendzimir, trustees
Original application June 11, 1954, Ser. No. 436,075, now Patent No. 2,932,997, dated Apr. 19, 1960. Divided and this application Jan. 26, 1960, Ser. No. 4,699
6 Claims. (Cl. 80—38)

This application is a division of my copending application Serial No. 436,075, filed June 11, 1954, now Patent No. 2,932,997 issued April 19, 1960, entitled Dual Drive Planetary Reducing Mills which, in turn, is a continuation-in-part of my copending applications Serial No. 582,344, filed March 12, 1945, now abandoned, and entitled Apparatus for the Production of Metallic Strips and Serial No. 762,683, filed July 22, 1947, now abandoned, and entitled Planetary Reducing Mills and Method. In these applications I have described types of planetary rolling mills adapted to make heavy reductions in slabs while the slabs are at elevated temperatures such as to affect their plasticity.

The primary objects of this invention are the provision of improvements which affect the control and operation of such mills, particularly the operation thereof at the time when the slab is first engaged in the active zone of the mill, the diminishing of the rearward forces exerted on the work piece by the planetary working rolls when making heavy reductions therein, and the provision of means and a mode of operation whereby such mills may be rendered self-feeding.

The important objects of the invention will be more readily understood by the skilled worker in the light of the explanation and disclosures which follow, and therefore will be pointed out, or will become apparent to him as the description proceeds. The various objects of the invention are accomplished by those constructions and arrangements of parts, and in those procedures of which certain exemplary embodiments will now be described. Reference is made to the accompanying drawings wherein:

FIGURE 1 is a diagrammatic sectional view of a planetary mill and feeding means.

FIGURE 2 is a partial perspective view of a backing roll, certain of the working rolls which surround it as satellites, and a retaining ring for the working rolls, the representation again being semi-diagrammatic.

FIGURE 3 is a diagrammatic perspective view of the retaining rings of a planetary mill and a means for driving them.

FIGURE 8 is a semi-diagrammatic view illustrating another apparatus and mode of operation in accordance with which the invention may be practiced.

FIGURE 9 is a related sectional view through a portion of the mill.

FIGURE 10 is a more detailed view of the apparatus assembly.

FIGURE 11 is a partial elevational view taken in the direction of the passage of a piece to be rolled through the mill of a modified type of mill in accordance with the invention, certain parts being represented in section.

FIGURE 12 is a sectional view of the mill taken along the line 12a—12a of FIGURE 11.

Figure 4:
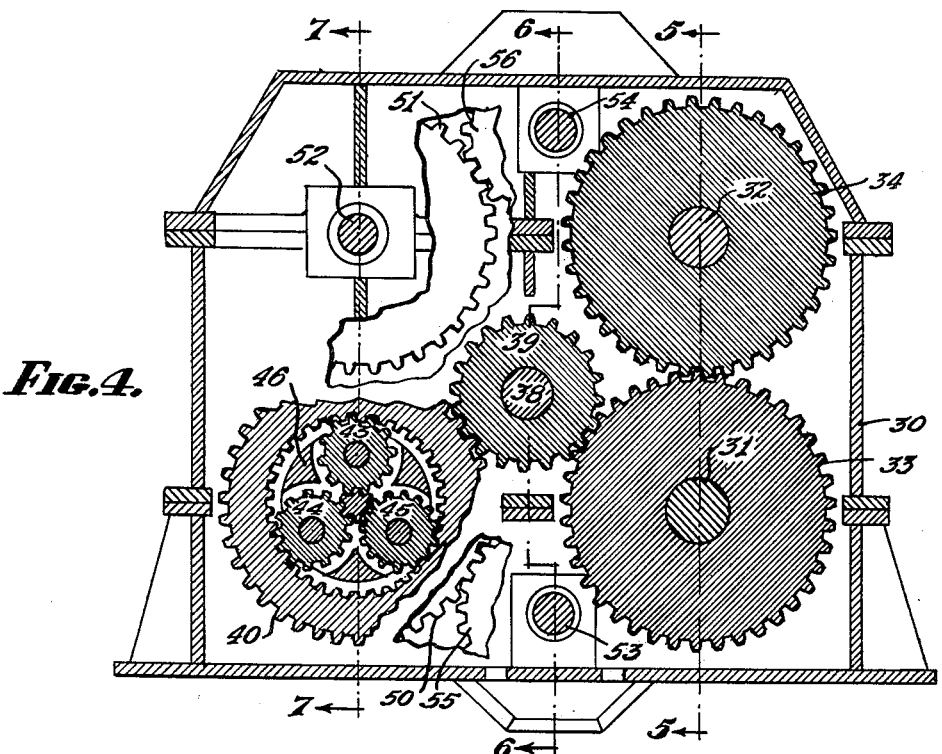
FIGURE 4 is a vertical sectional view of a pinion stand which may be used to drive a planetary mill in accordance with the principles of this invention.
Figure 5:
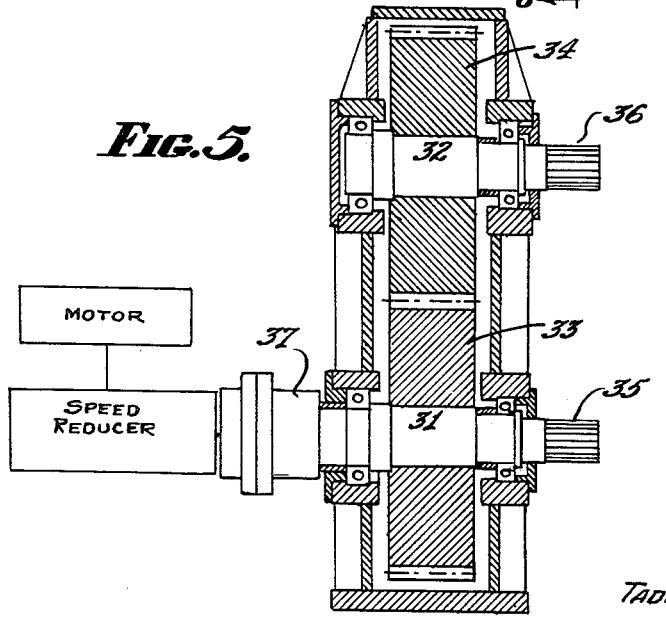
FIGURE 5 is a transverse vertical sectional view thereof taken along the line 5—5 of FIGURE 4.
Figure 6:
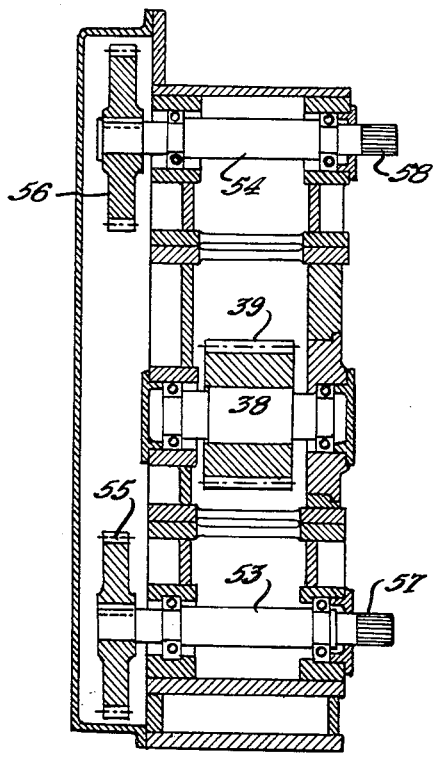
FIGURE 6 is a vertical transverse sectional view thereof taken along the line 6—6 of FIGURE 4.

In the preferred form of the mills described in my copending applications referred to herein, a pair of relatively large diameter driven backing rolls are provided as at 1 and 2 in FIGURE 1. About the periphery of these backing rolls a plurality of working rolls of relatively small diameter are arranged as satellites. In the figure, the working rolls for the upper backing roll are indicated at 3, while the working rolls for the lower backing roll are indicated at 4. The work piece 8 can be fed into the active zone of the mill by suitable feeding means inclusive of fluid pressure thrusting means, traveling gripping shoes and the like. Pinch roll feeding means are diagrammatically illustrated in FIGURE 1 at 9 and 10.

The working rolls are preferably so spaced that a plurality of those of each planetary series can engage the work piece simultaneously in the active zone of the mill. The mill is designed to make very heavy reductions in a work piece such as a cast or rolled slab. It is necessary that a working roll of each series, forming an operating pair, first engage the work piece at the same instant. To this end it is usual, as shown in FIGURE 2, to mount end portions or necks of the working rolls rotatively in retaining rings, one of which is shown at 11. By gearing the retaining rings together in proper orientation, simultaneous initial contact of working roll pairs is assured.

In the preferred operation the working rolls, being in frictional contact with the respective backing rolls are driven thereby, rolling forwardly on the work piece. If the work piece were not being fed and elongated, the working rolls turning in frictional contact with a backing roll upon one side and the surface of the work piece on the other, would have a planetary translational speed one half the peripheral speed of the backing rolls. But the work piece is being elongated in the active zone of the mill. The work piece enters the mill at a particular speed and leaves it at a very much greater speed which is proportional to the elongation produced in the work piece. The elongation in the active zone of the mill is progressively increasing from the entrance to the exit points; and for these reasons it is preferred to provide for the "precession" of the working rolls which, in the active zone of the mill, tend to rotate more rapidly and to increase their translational speed as the elongation increases.

Precession of the working rolls can be permitted by journaling the end portions of the working rolls movably in a circumferential direction in the retaining rings whereby the circumferential spacing of the working rolls can vary by precession in the direction of their translation, the journals having abutments effective at one side to establish a predetermined circumferential spacing of the working rolls. This is diagrammatically illustrated in FIGURE 2 where the working rolls 3 are shown as having necks 3a journaled in perforations in the ring 11, the perforations 12 being elongated in the circumferential direction as shown. One end of each such perforation acts as the abutment aforesaid; but the working rolls are permitted by the elongation of the holes to increase their rotative and translational speeds as the work piece differentially elongates in the active zone of the mill.

Similar results can also be obtained by providing elongated perforations in the retaining rings extending rearwardly rather than forwardly of the direction of translation of the working rolls, and, relying on the tendency of the retaining rings (due to rotational friction of the working roll necks in these perforations or in journals mounted therein) to run ahead of the true speed, sufficiently delay each work roll at its point of entry into the working zone so that it will have enough room to move forwardly for precessional purposes.

The diagrammatic showing of FIGURE 2 is ordinarily translated into more elaborate structures wherein the ends or necks of the working rolls are mounted in chocks or bearing members on the retaining rings, which bearing members are arranged to have movement in the circumferential direction but are resiliently urged against abutments at one side. Such constructions may also make provision for resiliently urging the chocks inwardly in the radial direction so as to keep the working rolls in frictional contact with the backing rolls in spite of wear.

If the retaining rings are merely geared together for synchronization when the mill is driven in the absence of a work piece, the retaining rings would tend to rotate too rapidly since there will be some friction in the working roll bearings. This may be undesirable since the sudden acceleration of the rotative speed of the working roll as it engages the metal may produce scuffing of the rolls.

In application Serial No. 582,344 there was described a structure wherein the working roll retaining rings were not only effectively geared together but also had a mechanical relationship with the drive of the backing rolls through a slip connection. Such a slip connection is required because it would not otherwise be possible to maintain the mill in operation in spite of wear of the backing rolls or the working rolls.

In general, such an arrangement has proved quite satisfactory excepting that care must be taken, especially when mounting newly reground rolls in the mill that the faces of the working rolls and backing rolls be dry and free of lubricant. Otherwise the mill may refuse to engage an entering slab because of slippage between the working rolls and the backing rolls, the retaining rings becoming stationary, the slip connection taking up any driving force between the backing rolls and the retaining rings.

This difficulty has been overcome in one aspect of the present invention, which contemplates dividing the mill drive into two parts each with a separate source of power. In this aspect of the invention the greater portion of the drive force used on the mill is applied to the two backing rolls; but an independent driving force is applied to the ends of the working rolls through the medium of the retaining rings in which the working roll necks are engaged. It is possible in this way to give to each working roll as it enters the active zone of the mill and engages the work piece or slab a positive drive in the rolling direction so that even if the frictional contact between the working roll and the backing roll should be insufficient at this point to cause the working roll properly to engage the work piece, correct engagement will be assured. Such a drive must, of course, be applied at the correct or approximately correct speed in relation to the rotative speed of the backing rolls.

In FIGURE 3 the working roll retaining rings for the lower planetary assembly are indicated at 14 and 15 while those for the upper planetary assembly are shown at 16 and 17. These retaining rings may be considered as members having external gear teeth. A shaft 18 extends transversely of the mill and bears pinions meshing with the teeth of the retaining rings 16 and 17. Similarly, a shaft 21 extends transversely of the mill and bears pinions 22 and 23 meshing with the teeth of the retaining rings 14 and 15. The shafts 18 and 21 carry bevel gears 24 and 25 at their ends which are in mesh with bevel gears 26 and 27 on a vertical shaft 28 to which is attached a variable speed electric motor 29 on other suitable prime mover.

In operation the motor 29 is started simultaneously with, or very soon after, the main mill motor (not shown but connected through a suitable pinion stand to backing rolls 1 and 2) and is brought to a speed corresponding to the correct speed for the retaining rings or working roll cages 14, 15 and 16, 17. This speed will be equal or close to the speed at which the retaining rings would be driven by the working rolls if the working rolls maintained frictional contact with the backing rolls on one side and a non-reducing surface on the other. It has been found from experience that this adjustment of speed does not need to be accurate. If anything, the retaining rings should be driven slightly faster when idling than their normal speed during an actual rolling operation.

Once the proper synchronism is attained, a slab can be safely fed into the mill and will be properly engaged by the working rolls without slippage or skidding, and the working rolls will maintain their proper speed relationships. The slab will, of course, be fed forwardly by outside feeding means capable of exerting an adequate thrust on the slab.

It may be pointed out that in the embodiment described in connection with FIGURE 3, a main mill motor drives the backing rolls while the retaining rings for the working rolls are driven by a separate prime mover 29. The mill is always started idle, i.e. before the working rolls are caused to engage the slab to be rolled. Depending somewhat upon the construction of the mill, the retaining rings for the working rolls may tend, when the mill is idling, to rotate at speeds either slower than or faster than their normal speeds in relation to the rotative speeds of the backing rolls. The latter condition most usually prevails due primarily to such friction as exists in the working roll neck bearings. Under these circumstances, while the mill is idling, the motor 29 may act as a drag to retard unduly rapid rotation of the retaining rings. In either event, however, the motor 29 not only acts to produce and maintain the approximate synchronism required but also insures the correct engagement of the working rolls with the work piece when it is introduced into the mill.

In FIGURES 4 to 7 inclusive there is shown another embodiment of the invention wherein there is an interconnection between the drive of the backing rolls and the driving means for the retaining rings. Here, a pinion stand is illustrated as comprising a suitable framework or housing 30. At one side of this housing shafts 31 and 32 are journaled in vertically spaced position and are interconnected by gears 33 and 34. The shafts have couplings 35 and 36 at one end by means of which they can be connected through suitable spindles with the necks of the backing rolls of the planetary mill. The shaft 31 carries on its other end a coupling 37 by means of which it is connected to the main mill motor, through a speed reducer if desired, both being indicated diagrammatically.

Figure 7:
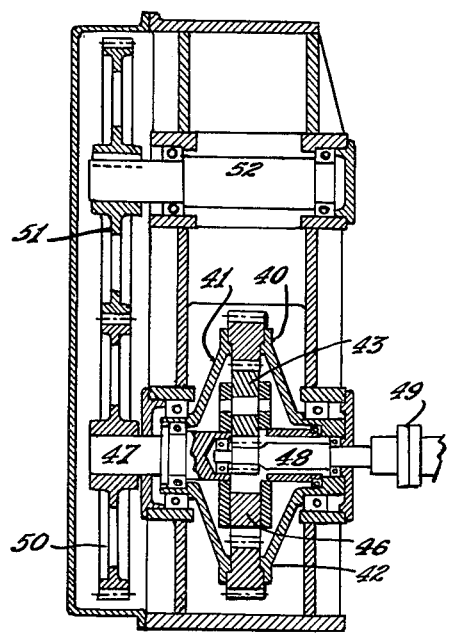
FIGURE 7 is a vertical transverse sectional view thereof taken along the line 7—7 of FIGURE 4.

Centrally of the pinion stand there is journaled a stub shaft 38 bearing a gear 39 which meshes both with the gear 33 on the shaft 31 and with the external teeth of the ring gear 40 of a differential mechanism. As can be seen in FIGURES 4 and 7 the ring gear 40 which is mounted and journaled by means of flanges 41 and 42 carries internal teeth meshing with planetary gears 43, 44, and 45. These planetary gears are mounted on stub shafts journaled in a spider 46 which is affixed to a stub shaft 47. The planetary gears 43, 44, and 45 are also in mesh with teeth cut on the end of a stub shaft 48. This shaft bears a coupling 49 by means of which it is connected to a variable speed motor (not shown).

The stub shaft 47 carries a gear 50 which meshes with another gear of the same size 51 on an upper stub shaft 52. Centrally of the pinion stand, as most clearly shown in FIGURES 4 and 6, shafts 53 and 54 are journaled in vertically spaced relationship. These shafts are connected respectively by gears 55 and 56 with the gears 50 and 51 hereinabove described. The shafts 53 and 54 are provided with couplings 57 and 58 which may be connected by means of spindles with those shafts in the mill which have geared connection to the working roll retaining rings. Such shafts are the shafts 21 and 18 illustrated in FIGURE 3.

In the apparatus of FIGURES 4 to 7, it will be understood that the speed of rotation of the stub shaft 47 of the differential mechanism is a function of the speed of the differential ring gear 40 (driven from the main mill motor as hereinabove described) and the speed and direction of rotation of the shaft 48 driven by the supplementary variable speed motor. In this embodiment considerably larger forces can be applied to push the working rolls into the active zone of the mill, since the gears of the pinion stand and differential are so calculated that with new rolls in the mill, the pinion shaft 48 has only a very low necessary speed. Its speed can be gradually increased as the working rolls wear or are dressed to smaller diameters. In this way, using a variable speed motor the size of which does not exceed, say, 10 or 15% of the size of the constant speed main motor of the mill, it is possible to exert pushing forces on the working rolls which are close to the full capacity of their bearings.

The application of a strong pushing force to the ends of the working rolls during the actual rolling operation also has another function: it helps to feed the slab into the planetary mill. Where the working rolls of a planetary mill are producing a heavy reduction in a slab, and first contact the slab while they are moving in a translational direction at a relatively high angle to the axis of the slab, the compressional forces exerted by the working rolls have strong rearward components. In the active zone of the mill, as the working rolls roll forwardly on the slab, these rearward components diminish until, just before the working rolls leave the surface of the reduced slab the situation may be reversed and a forward or feeding force component may be encountered. Throughout the greater part of the active zone of the mill, however, where a heavy reduction is being taken in a slab, the strong rearward forces exerted on the slab must be overcome by the pushing force exerted on the slab by a feeding apparatus of any of the kinds discussed above. This means that the slab in the active zone of the mill is subject not only to compression in the transverse direction but also in the longitudinal direction. Actually there will be compression in the third direction, namely parallel to the axis of the working rolls. This is because of the tendency of the metal to spread widthwise when being heavily reduced, which tendency is resisted by frictional engagement between the metal and the working rolls. When rolling cast or other slabs having a dendritic or similar structure susceptible to cracking or disruption when heavy hot reductions are taken therein, the operation of the mill so as to attain all-over conditions of compression throughout that part of the working zone in which the greater portion of the reduction takes place is highly valuable.

But when rolling materials which are sufficiently ductile in the heat-softened condition to eliminate the danger of disruption during reduction, it is advantageous to diminish the rearward forces exerted on the slab so as to diminish power requirements in the feeding apparatus. Moreover, at the conclusion of the rolling of any individual slab it is advantageous that the mill be in a self-feeding condition, since otherwise it becomes necessary to open the mill up to permit the withdrawal of an unrolled end of the slab. To obviate this necessity, it has been suggested that a slab pushing means be employed having a nose of such thinness as to be capable of pushing the slab end through the mill. This, however, has obvious disadvantages. It has also been suggested that successive slabs be joined together by welded joints capable of passing through the mill, a continuous feeding means being employed. The making of such welded joints is inconvenient and time consuming. The more common method is to feed the slabs directly one after another without any gap between them, so that the leading end of a slab pushes the trailing end of the preceding slab through the planetary rolls. This method is good, but it requires accurately squared slabs and in many cases ordinary hot shears do not crop slabs sufficiently square for this purpose. If the mill can be rendered self-feeding at least at the conclusion of the reduction of any individual slab, these difficulties can be avoided.

As has been explained, the working rolls, rolling freely between the backing roll on one side and the slab on the other will generate substantial rearward forces so long as the tangent to their orbit of translation lies at a substantial angle to the axis of the slab. These rearward forces can be diminished or overcome by causing the working rolls to exert a forward pushing force on the slab in the active zone of the mill. Theoretically at least, if a braking torque were applied to the working rolls in the active zone of the mill, they would rotate less readily between the backing roll and the work piece, and would tend to increase their translational speeds, thereby exerting a forward drag on the work piece. Similarly if in the arrangement shown in FIGURE 5 the mill were driven solely by rotating the retaining rings 14, 15, 16 and 17 by means of the motor 29, the backing rolls being permitted to run idle, the rearward components of force exerted by the working rolls on the slab could be diminished by applying a braking torque to the backing rolls.

In mills of the type under discussion it is more advantageous to apply the main driving torque to the backing rolls; but in the arrangement shown in FIGURE 3 if the motor 29 is employed to urge the retaining rings forwardly during the actual operation of rolling under a substantial force (which should be short of that which would produce slipping of the working rolls with respect to the backing roll) this force will be applied against the rearward force components exerted by the working rolls on the work piece. Thus, the force required to be exerted by the separate feeding instrumentality can be diminished or canceled. In particular it is possible to increase the power applied to motor 29 at the conclusion of the rolling of an individual slab to such an extent as to cause the slab end to pass through the mill and be reduced, especially if a pull is exerted on the finished strip at the exit side of the planetary mill.

The arrangement shown in FIGURES 4 to 7 inclusive permits the application of a stronger driving force to the retaining rings under more exacting conditions, and may be employed as set forth above either to diminish the required feeding force, to insure the rolling of the trailing end of a slab, or to cause the mill to be self-feeding throughout an entire rolling operation.

In the embodiments of FIGURES 3 to 7 hereof, the pushing force is applied to the working rolls through the bearings thereof in the retaining rings. Assuming negligible friction in the neck journals of the working rolls, the pushing force will pass substantially normally through the axis of the working roll. Since the working roll is rolling upon the surface of the backing roll, the net feeding force has a leverage of 1:2 to its disadvantage, i.e. for every ton of pushing force applied to the neck bearings of the working rolls the feeding effect upon the slab will be reduced to half that amount.

Even so, an advantage is obtained not only because the external feeding device can be made lighter, but also because it tends to guide the slab better in the mill. It is possible, however, in accordance with the present invention to obviate the leverage disadvantage mentioned above by applying the pushing force to the end of each working roll, not through its axis, but substantially through the generant of the working roll which contacts the slab. FIGURES 8, 9 and 10 of this application relate to such a system.

In these figures the numeral 59 indicates a backing roll with which a working roll 60 is in frictional contact on one side, the working roll contacting the slab 61 on its other side. The end portion of the working roll 60 is formed to present a toothed gear portion 62, the pitch diameter of which is slightly larger than the diameter of the working section of the working roll. If the gear section of the working roll end can be caused to engage the teeth of a stationary rack member 63 in the active zone of the mill, it will be seen that the effectively larger diameter of the gear section 62 as compared with the smaller diameter of the working face of the working roll 60 to roll forwardly on the backing roll 59 thereby exerting a forward pushing force on the slab 61. In this case, just as in the embodiment shown in FIGURE 1, the two backing rolls (one of which is shown at 59) are driven from an outside source and they in turn drive the work rolls 60, 64 by friction along their lines of contact. Moreover, it will be seen that the turning force exerted by the rack 63 on the gear section of the working roll is a force exerted slightly outwardly in a radial direction from the radial position of contact between the working roll and the slab. Thus, there is no disadvantageous lever ratio, but on the contrary a slight advantage. For a given application of force the forward push on the work piece will be very greatly increased.

Each working roll will, of course, have a gear section as explained at each end. Since the distance between the planetary assemblies will be small at the exit ends of the active zone, it will be necessary to stagger the gear sections of the working rolls of the lower planetary assembly with respect to the upper in order to provide space for the racks. As shown in FIGURE 9, 64 indicates the working portion of a working roll of the lower planetary assembly. This working roll has a gear section 65 formed on an extension of the working roll outwardly beyond the gear section 62 of the working roll 60. The gear section of working roll 64 engages a stationary rack 66 as shown.

The stationary racks need only be located in the mill in a position to engage the gear sections of the working rolls just before the working rolls make contact with the slab, and they need not be carried entirely through the active zone of the mill. As a matter of fact, the stationary racks need extend only about two-thirds of the distance through the active zone of the mill from the entrance end of that zone, since therebeyond the horizontal components of the forces exerted by the working rolls on the work piece decrease to zero or reverse direction.

In the embodiment of FIGURES 8, 9 and 10 some means will be provided in the mill to keep the working rolls in contact with the backing rolls as they follow their planetary orbits thereabout. This may be done by resilient guide means acting to maintain frictional contact between the working rolls and the backing rolls, or retaining rings such as are shown at 67 and 68 may be used. It is also desirable to provide a means which will orient the gear sections of the working rolls in such fashion that when they reach the entering ends of the racks 63 and 66 their gear teeth will mesh with the gear teeth of the racks. To this end there may be employed at each end of each backing roll a ring gear element with external teeth meshing with the teeth of the gear sections of the working rolls. A ring gear for the upper planetary assembly is indicated at 69 in FIGURES 9 and 10. A ring gear for the lower planetary assembly is indicated at 70 in FIGURE 9. By reason of the difference in the effective diameters of the gear sections and working section of each working roll, the ring gear elements 69 and 70 cannot be affixed to the respective backing rolls or their necks but must be rotatively mounted so as to be free to assume a speed related to, but not the same, as the speed of the backing roll. In order to facilitate meshing of the gear sections of the working rolls with the respective stationary racks, the teeth at the entering ends of these racks may be made thinner as indicated at 71 in FIGURE 10. If retaining rings 67, 68 are used they may be left undriven or may be driven in any of the ways set forth above.

In the embodiments of FIGURE 3 and of FIGURES 4 to 7 inclusive, the feeding force on the working rolls is supplied wholly or in part from an independent outside prime mover distinct from the main mill motor. In the embodiment of FIGURES 8 to 10 inclusive a second or supplementary driving prime mover may be dispensed with, the main drive as well as the feeding drive coming from the same source, namely the main mill motor. Even so, however, two different functions are involved. The plastic deformation of the work piece in the active zone of the mill occurs from the rolling action of the working rolls as driven by the backing rolls. At the same time there is a feeding drive due to the engagement of the gear sections of the working rolls with the stationary racks, which drive occurs at high pressure but at a slow forward speed. For example, a feed of between .010 inch and .050 inch per pair of planetary working rolls may be employed. The leverage of engagement is very high, and the extra force supplied to the point of contact between the working rolls and the work piece need be only a few percent higher than it would have been without the self-feeding feature. The pitch diameter of the gear sections of the working rolls need be only a few percent greater than the diameter of the bodies of the working rolls. The proportion of these two diameters determines the rate of feed per working roll; but since a planetary mill is capable of normal operation at a constant rate of feed, this rigidity of proportion is no handicap. It can be altered, of course, by changing the diameter of the working roll body with respect to the effective or pitch diameter of the gear section thereof, as by grinding.

It will be understood by those skilled in the art that in rolling mills of the character herein described, as in other mills, provision must be made for grinding or dressing the rolls when they become worn or scuffed, so that the rolls can be reused a number of times without replacement. When it becomes necessary to dress the working faces of the working rolls 60, 64, I prefer to dress the gear sections of the same rolls an equivalent amount so as to maintain the desired ratio between the diameter of the working roll body and the effective diameters of its gear segments. While it is true that in dressing the rolls a very small quantity of metal will normally be removed from their surfaces, a number of successive dressing operations may result in an appreciable change in the diameters of the gear sections. Meshing will be maintained with the ring gear elements 69 and 70 irrespective of these changes; but in order to assure continued effective meshing with the rack elements 63, 66, I may divide these elements into two portions providing a portion 63a or 66a which is movably mounted with respect to the other portion and is spring pressed as at 72 in FIGURE 10, the original tooth thickness in both racks being somewhat less than normal.

Precession is provided for in the structure of FIGURES 8, 9 and 10 by the existence of a small amount of play between the teeth of the gear sections of the working rolls and the teeth of the stationary rack members. In other words, the working rolls are permitted to roll slightly ahead of their normal positions due to differential elongation of the work piece in the active zone, even though their gear sections are in mesh with the teeth of the stationary racks. But the stationary racks, it may also be pointed out, do not ordinarily extend entirely through the active zone of the mill. The need for precession is greatest near the exit end of the active zone, and here the working roll gear sections will have come out of engagement with the teeth of the stationary racks.

Due to space requirements in the active zone of the mill, it is not ordinarily possible to make the racks 63 and 66 in the form of complete, interiorly toothed ring gears. It is possible to do this and also to apply a driving force to these ring gears only in so-called "slabbing" planetary mills which merely somewhat reduce the thickness of a slab, for example, mills which reduce a slab 10 in. in thickness to one 4 in. in thickness. In such cases a similar feeding action can be attained by driving the ring gears without the provision of a difference in the effective diameters of the working roll bodies and their gear sections. It is possible in some instances to substitute for the stationary racks 63 and 66 movable continuous chains on which gear teeth are formed, and to drive the chains so as to cause the working rolls to exert the described feeding force on the work piece. The embodiment employing stationary racks as illustrated in FIGURES 8 to 10 inclusive has the merits, however, of simplicity and ruggedness, and does not require a separate driving instrumentality.

An embodiment of a mill using chains for the purpose set forth above is shown in FIGURES 11 and 12. In these figures, insofar as possible, like index numerals have been employed to indicate parts similar to those illustrated in FIGURES 8 and 9. The working rolls, one of each set being indicated at 60 and 64, have pinion elements 62 and 65 at their ends. These pinion elements mesh with ring gear elements 69 and 70 respectively, these ring gear elements being respectively mounted rotatably on the necks of backing rolls 59 and 59a. Since these ring gear elements are provided only to help maintain the circumferential spacing of the working rolls about their backing rolls, the effective diameters of the pinion elements 62 and 65 may be larger or smaller than the diameters of the corresponding working rolls.

For the purpose of exerting a feeding force upon the slabs 61 the working rolls 60 of the upper assembly are provided near each end with sprockets 75. A chain 76 at each end of the assembly engages these sprockets and also two additional sprockets located externally of the planetary assembly. One of these is the sprocket 77 keyed to the shaft 78 which is driven by an external variable-speed motor (not shown). The other is a take-up sprocket 79 which is mounted movably in the mill assembly so that the chain can be maintained under tension. The position of the take-up sprocket 79 is such as at least in part to relieve the chain 76 of the gravitational force of working rolls approaching engagement with the work piece in the roll bite.

It will be seen from FIGURE 12 that the chain 76 engages working rolls in the upper assembly from A to B and from C to D. The intervening working rolls are not engaged by the chain 76, so that means must be provided coacting with the ring gear element 69 to maintain the spacing of the working rolls about the periphery of the backing roll 59. Consequently the working rolls 60 are provided at each end with a second sprocket 80. These sprockets are engaged by another chain 81 which also passes over an external sprocket 82 keyed on a shaft 83. This sprocket is employed to maintain tension on the chain 81 and may also be used to drive it if desired. For this purpose it can be connected with the same or a different external variable-speed motor. It will be seen from FIGURE 12 that the chain 81 engages the working rolls of the upper assembly from D clockwise to C, so that all of the working rolls of the upper assembly are at all times in contact with one or the other of the chains 76 and 81.

A similar arrangement is provided for the working rolls in the lower planetary assembly. Here the working rolls 64 are provided with a pair of sprockets 84 and 85 at each end. The sprockets 84 are engaged by a chain 86 which passes over a take-up sprocket 87 and a driving sprocket 88 keyed to a shaft 89 which in turn is connected with an external variable-speed motor, preferably the same as that which drives shaft 78. The sprockets 85 engage a chain 90 which passes over an external sprocket 91 keyed to a shaft 92. The sprocket 91 acts as a take-up for the chain 90 and may also be used for driving purposes if desired.

Bearing chocks for the backing rolls 59 and 59a are diagrammatically indicated in FIGURE 12 at 93 and 94.

It will be clear from what has been described above how the chains may be driven so as to cause the working rolls 60 and 64 to exert a forward force on the work piece 61 in the active zone of the mill. It should be kept in mind that in the event the effective diameter of the sprockets 75, 80, 84 and 85 bear a similar ratio to the diameters of the working rolls 60 and 64 as has been described in connection with FIGURE 9, then the speed of the pulling chains will be zero although the up feeding force will be attained in exactly the same manner as with the fixed racks illustrated in FIGURE 9. At the same time—and herein lies the advantage of the use of the driving chains—as the working rolls 60 and 64 wear down or are ground down to smaller diameters it is no longer necessary to regrind the sprockets aforesaid. The speed of the drive for the chains will vary in accordance with differences in effective diameters of the sprocket elements and the working roll faces so that the necessary feeding force on the slab 61 can be maintained at all times.

There is another way in which a second driving force can be exerted on the work rolls of a planetary mill. This can be made use of only under rolling conditions where at least two pairs of work rolls can simultaneously contact the work piece. Hitherto, in planetary mills, it has been the practice to provide for precession of the rolls by reason of the differential elongation of the metal in the active zone of the mill as described above. But if precession is prevented, as by blocking the working roll neck chocks or by mounting the working roll necks in circumferentially fixed bearings in the retaining rings, it will be evident that as a pair of working rolls rolls forwardly on the slab in the active zone of the mill, the differential elongation of the metal will tend to force this pair of work rolls to move forwardly at an increasing translational speed. If when this occurs the second or succeeding pair of work rolls comes into contact with the work piece, a forward translational force will be applied to it through the roll retaining rings.

By way of example, in a planetary mill having 20-in. diameter backing rolls and 2-in. diameter working rolls, rolling a slab 1⅛-in. in thickness down to .080-in. where the work rolls were so arranged that more than one pair contacted the work piece, it was found that surface defects such as laminations (probably due to incipient back fins) were alleviated by preventing the precession of the rolls. This is believed to be due to the forward drag on the following pairs of work rolls at the instant they engage the work piece. The extra force applied in this fashion is not effective, however, in feeding the work piece.

It will be evident that if the conditions of reduction are such that just as one pair of work rolls first engages the work piece, another pair of work rolls is about to leave it, the effect of the differential elongation of the metal in tending to drive the work roll retaining rings forwardly, will be greatest.

Modifications of the invention may be made without departing from the spirit thereof. The invention has been described in certain exemplary embodiments; and what is claimed as new and is desired to be secured by Letters Patent is as follows:

1. In a planetary rolling mill, a pair of driven backing rolls adjustable toward and away from each other for screwdown purposes, a series of working rolls arranged as satellites about the periphery of each backing roll and arranged to be driven by frictional contact therewith, means for maintaining predetermined radial positions of said working rolls about the peripheries of said backing rolls so as to insure simultaneous initial contact of a working roll of each series with a work piece being reduced in said mill, and means for applying to said working rolls in the active zone a force urging the working rolls forwardly in the direction of their translation about said backing rolls whereby to cause said working rolls in said active zone to exert on the work piece a forwardly directed pushing force, the ends of the said working rolls being mounted in retaining rings, the said rings being geared together, the said force applying means including a connection between said rings and a variable speed prime mover distinct from a source of power connected to said backing rolls.

2. In a planetary rolling mill, a pair of driven backing rolls adjustable toward and away from each other for screwdown purposes, a series of working rolls arranged as satellites about the periphery of each backing roll and arranged to be driven by frictional contact therewith, means for maintaining predetermined radial positions of said working rolls about the peripheries of said backing rolls so as to insure simultaneous initial contact of a working roll of each series with a work piece being reduced in said mill, and means for applying to said working rolls in the active zone a force urging the working rolls forwardly in the direction of their translation about said backing rolls whereby to cause said working rolls in said active zone to exert on the work piece a forwardly directed pushing force, the ends of the said working rolls being mounted in retaining rings, the said rings being geared together, the said force applying means including a driving connection between said rings and said backing rolls which connection includes a differential and a separate source of power connected to the free member thereof.

3. In a rolling mill for the purposes described, a driven backing roll of relatively large diameter, a series of working rolls of relatively small diameter arranged as satellites for translational movement about said backing roll and having frictional contact therewith whereby they are driven, said working rolls being so closely spaced about the periphery of said backing roll that a plurality of them can simultaneously contact a work piece being rolled, retaining rings rotatively mounted at the ends of said backing roll, said working rolls having end portions journaled with respect to said rings, movably in a circumferential direction whereby the circumferential spacing of said working rolls can vary by precession in the direction of translation thereof, said journals having abutments effective at one side to establish a predetermined circumferential spacing of said working rolls, driving means for said backing roll, and driving means for said retaining rings for urging said rings forwardly in the translational direction but with a force insufficient to cause slipping of said working rolls with respect to said backing roll under rolling conditions.

4. In a rolling mill for the purposes described, a pair of driven backing rolls of relatively large diameter, a series of working rolls of relatively smaller diameter arranged as satellites for translational movement about each of said backing rolls, the working rolls of each series being in frictional contact with their respective backing rolls, whereby they are driven, and being so closely spaced about the periphery of said backing rolls that a plurality of the working rolls of each series can simultaneously contact a work piece being rolled, retaining rings rotatively mounted at the ends of each backing roll, the working rolls of each series having end portions journaled with respect to said rings movably in a circumferential direction whereby the circumferential spacing of said working rolls can vary by precession in the direction of translation thereof, said journals having abutments effective at one side to establish a predetermined circumferential spacing of said working rolls in each series, said retaining rings being geared together to insure simultaneous contact of a working roll of each series with the work piece, power means for driving said backing rolls, and separate power means for driving said retaining rings, said last mentioned power means being variable as to speed so as to permit timing of the retaining rings with respect to the backing rolls and insure non-slip engagement of a work piece by said working rolls when said work piece is fed to the idling mill.

5. In a rolling mill for the purposes described, a pair of driven backing rolls of relatively large diameter, a series of working rolls of relatively smaller diameter arranged as satellites for translational movement about each of said backing rolls, the working rolls of each series being in frictional contact with their respective backing rolls, whereby they are driven, and being so closely spaced about the periphery of said backing rolls that a plurality of the working rolls of each series can simultaneously contact a work piece being rolled, retaining rings rotatively mounted at the ends of each backing roll, the working rolls of each series having end portions journaled with respect to said rings movably in a circumferential direction whereby the circumferential spacing of said working rolls can vary by precession in the direction of translation thereof, said journals having abutments effective at one side to establish a predetermined circumferential spacing of said working rolls in each series, said retaining rings being geared together to insure simultaneous contact of a working roll of each series with the work piece, power means for rotating said backing rolls, and a connection between said retaining rings and said backing rolls which connection includes a differential mechanism and a separate source of power.

6. A planetary rolling mill having a pair of relatively large diameter backing rolls, a series of working rolls arranged as satellites about the periphery of each backing roll, retaining rings in which the ends of the working rolls in each series are journaled, the retaining rings of each planetary assembly being geared to a separate shaft, and a pinion stand including a pair of shafts geared together, means for connecting one of said shafts to a main mill motor, means for connecting both of said shafts to the backing rolls of said mill, an additional pair of shafts geared together, means for connecting said last mentioned shafts to the shafts geared to said retaining rings and an interconnection in said pinion stand between said first mentioned pair of shafts and said last mentioned pair of shafts, said connection including a differential mechanism with a separate source of power.

No references cited.